United States Patent
Fujiwara

(10) Patent No.: US 10,108,790 B2
(45) Date of Patent: Oct. 23, 2018

(54) PASSWORD AUTHENTICATING DEVICE FOR PREVENTING LEAKAGE OF PASSWORDS

(71) Applicant: KYOCERA Document Solutions Inc., Osaka (JP)

(72) Inventor: Yoshiyuki Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 1 day.

(21) Appl. No.: 15/719,308

(22) Filed: Sep. 28, 2017

(65) Prior Publication Data

US 2018/0089406 A1    Mar. 29, 2018

(30) Foreign Application Priority Data

Sep. 28, 2016  (JP) .................................. 2016-189153

(51) Int. Cl.
 *G06F 21/31*  (2013.01)
 *G06F 21/84*  (2013.01)

(52) U.S. Cl.
 CPC .............. *G06F 21/31* (2013.01); *G06F 21/84* (2013.01)

(58) Field of Classification Search
 CPC .......... G06F 21/30; G06F 21/31; G06F 21/45; G06F 21/46; G06F 21/84; H04L 63/083; H04L 63/0846
 See application file for complete search history.

(56) References Cited

U.S. PATENT DOCUMENTS

| | | | | |
|---|---|---|---|---|
| 5,950,195 A | * | 9/1999 | Stockwell | ............... H04L 63/02 |
| 9,401,914 B1 | * | 7/2016 | Jiang | .................... H04L 63/083 |
| 9,521,127 B1 | * | 12/2016 | Childress | ................ H04L 63/06 |
| 2004/0220996 A1 | * | 11/2004 | Huang | .................... H04L 63/02 |
| | | | | 709/201 |
| 2005/0160297 A1 | * | 7/2005 | Ogawa | .................... G06F 21/31 |
| | | | | 726/19 |
| 2007/0180255 A1 | * | 8/2007 | Hanada | ................... G06F 21/31 |
| | | | | 713/176 |

(Continued)

FOREIGN PATENT DOCUMENTS

| | | |
|---|---|---|
| JP | 2004-326525 A | 11/2004 |
| JP | 2009-223470 A | 10/2009 |
| JP | 2014-056345 A | 3/2014 |

*Primary Examiner* — Joseph P Hirl
*Assistant Examiner* — Thomas Gyorfi
(74) *Attorney, Agent, or Firm* — Hawaii Patent Services; Nathaniel K. Fedde; Kenton N. Fedde

(57) ABSTRACT

Provided is a password-authenticating device that does not allow a password to be perceived from the hand movement of an operator while entering a password. The password-authenticating device according to the present disclosure executes a login process by comparing an entered password candidate with a registered password. The password-authenticating device includes a comparison unit and authenticating unit. When the entered password candidate matches the registered password, the comparison unit receives re-entry of the password candidate a set number of times of dummy input. After re-entry of the password candidate has reached the number of times of dummy input, the authenticating unit executes the login process regardless of whether or not the re-entered password candidate matches the registered password.

7 Claims, 7 Drawing Sheets

(56) References Cited

U.S. PATENT DOCUMENTS

| | | | | |
|---|---|---|---|---|
| 2008/0005340 A1* | 1/2008 | Herley | ............. | H04L 63/145 709/229 |
| 2013/0127725 A1* | 5/2013 | Sugimoto | ............. | G06F 3/02 345/168 |
| 2015/0281212 A1* | 10/2015 | Shin | ............. | G06F 21/30 726/7 |
| 2015/0363592 A1* | 12/2015 | Dubey | ............. | G06F 21/46 726/6 |
| 2016/0378961 A1* | 12/2016 | Park | ............. | G06F 21/32 726/19 |

\* cited by examiner

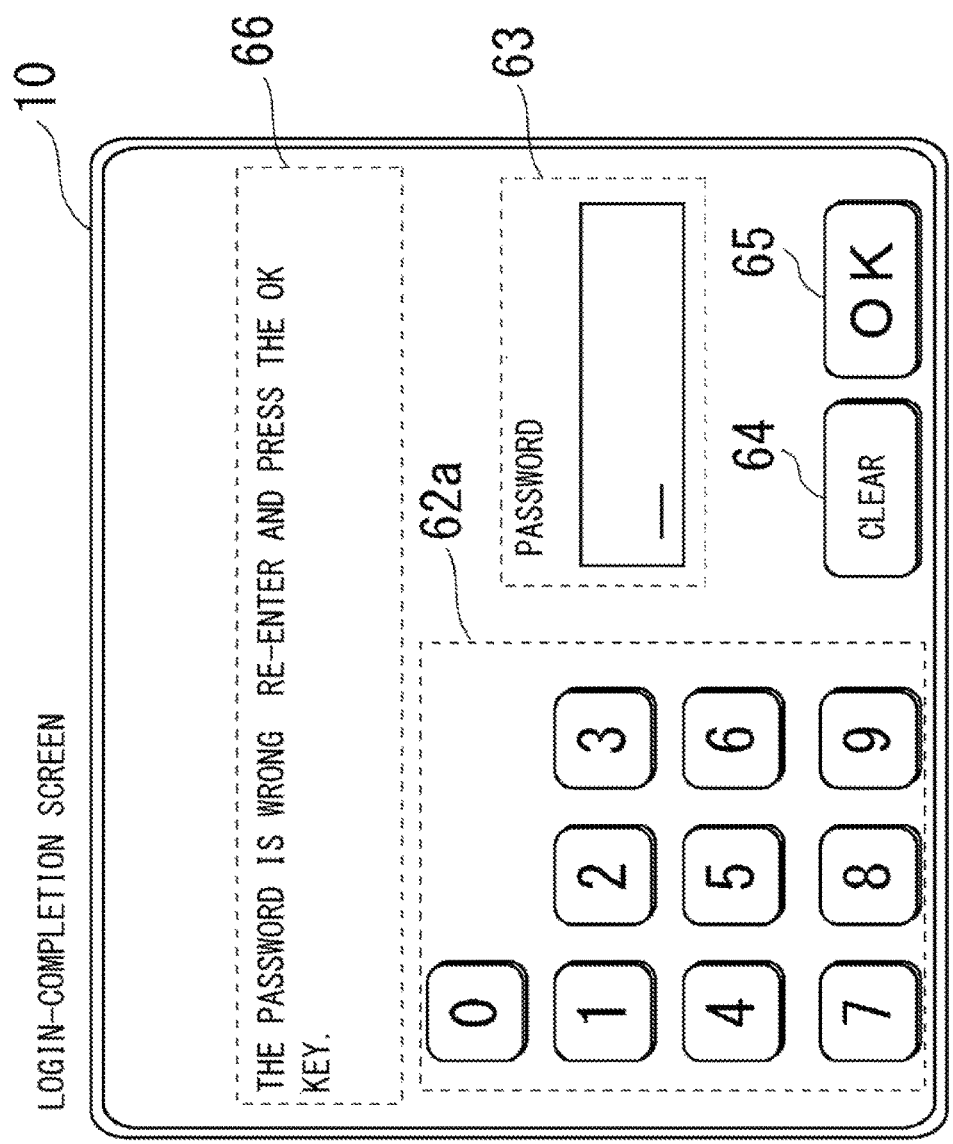

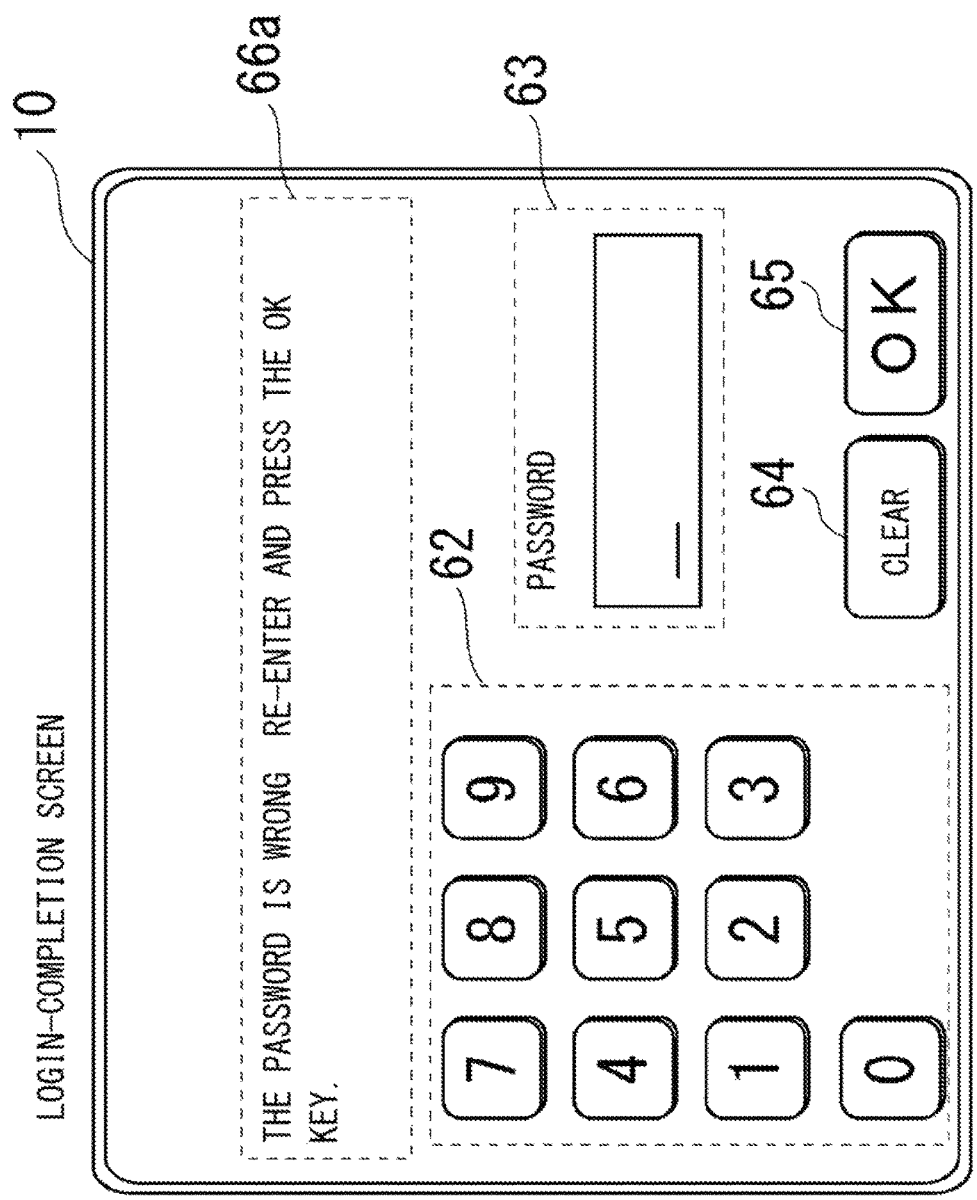

PASSWORD AUTHENTICATING DEVICE FOR PREVENTING LEAKAGE OF PASSWORDS

INCORPORATION BY REFERENCE

This application is based on and claims the benefit of priority from Japanese Patent Application No. 2016-189153 filed on Sep. 28, 1016, the contents of which are hereby incorporated by reference.

BACKGROUND

The present disclosure relates to a password-authenticating device for preventing leakage of passwords.

In an image forming apparatus such as a copier, a printer, a multifunctional peripheral and the like, or in an information-processing apparatus such as a computer and the like, a user-authenticating function that uses passwords may be provided. From the aspect of maintaining security, it is necessary to prevent leakage of passwords to a third party. Therefore, technology is proposed that hides displayed characters and symbols when entering a password. Furthermore, technology is also proposed that hides displayed characters and symbols in stages according to distance when entering a password.

SUMMARY

The password-authenticating device according to the present disclosure executes a login process by comparing an entered password candidate with a registered password. The password-authenticating device includes a comparison unit and authenticating unit. When the entered password candidate matches the registered password, the comparison unit receives re-entry of the password candidate a set number of times of dummy input. After re-entry of the password candidate has reached the number of times of dummy input, the authenticating unit executes the login process regardless of whether or not the re-entered password candidate matches the registered password.

BRIEF DESCRIPTION OF THE DRAWINGS

FIGS. 6A and 6B illustrate examples of a login-completion screen that is displayed on the touch panel illustrated in FIG. 1.

DETAILED DESCRIPTION

Next, an embodiment according to the present disclosure will be explained in detail with reference to the drawings.

Figure 1:
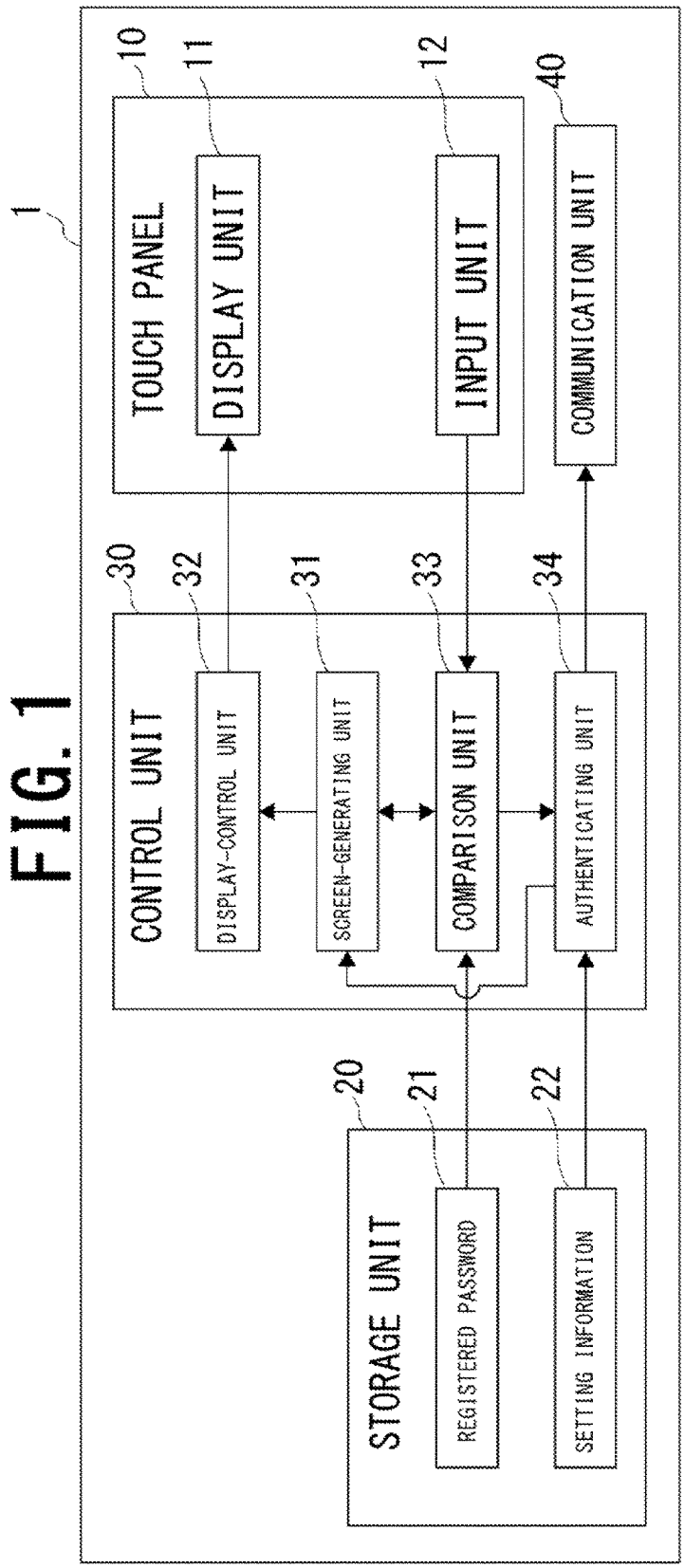
FIG. 1 illustrates an overview of the configuration of an embodiment of a password-authenticating device according to the present disclosure.

The password-authenticating device 1 of this embodiment receives a password that is entered by an operator as a password candidate for comparison, and performs authentication of the entered password. Referring to FIG. 1, the password-authenticating device 1 includes a touch panel 10, a storage unit 20, a control unit 30 and a communication unit 40.

The touch panel 10 is provided with a transparent pressure-sensitive sensor on the front surface of a display panel such as a liquid-crystal display panel. The display panel of the touch panel 10 functions as a display unit 11 that displays various operation keys and the password entry status. The pressure-sensitive sensor of the touch panel 10 functions as an input unit 12 that receives entry of a password and various operations.

The storage unit 20 is storage means such as a semiconductor memory and the like. The storage unit 20 stores a registered password 21 and setting information 22. The registered password 21 and setting information 22 are registered during initial setup or when a new user is registered and stored in the storage unit 20.

The control unit 30 is an information-processing unit such as a microcomputer and the like that includes a CPU, ROM, RAM and the like. The ROM stores a control program for performing control of the operation of the password-authenticating device 1. The CPU of the control unit 30 performs overall control of the device by reading the control program that is stored in the ROM, and expanding that control program in the RAM. Moreover, the control unit 30 functions as a screen-generating unit 31, a display-control unit 32, a comparison unit 33 and an authenticating unit 34.

The communication unit 40 has a function of transmitting data to a pre-registered destination (portable terminal and the like) via a network such as the Internet, LAN and the like.

During initial setup, or when registering a new user or the like, the screen-generating unit 31 generates a login-authentication-setting screen for receiving a registration of a registered password 21 and setting information 22. During initial setup, or when registering a new user or the like, the display-control unit 32 causes the login-authentication-setting screen to be displayed on the touch panel 10 as illustrated in FIG. 2.

Figure 2:
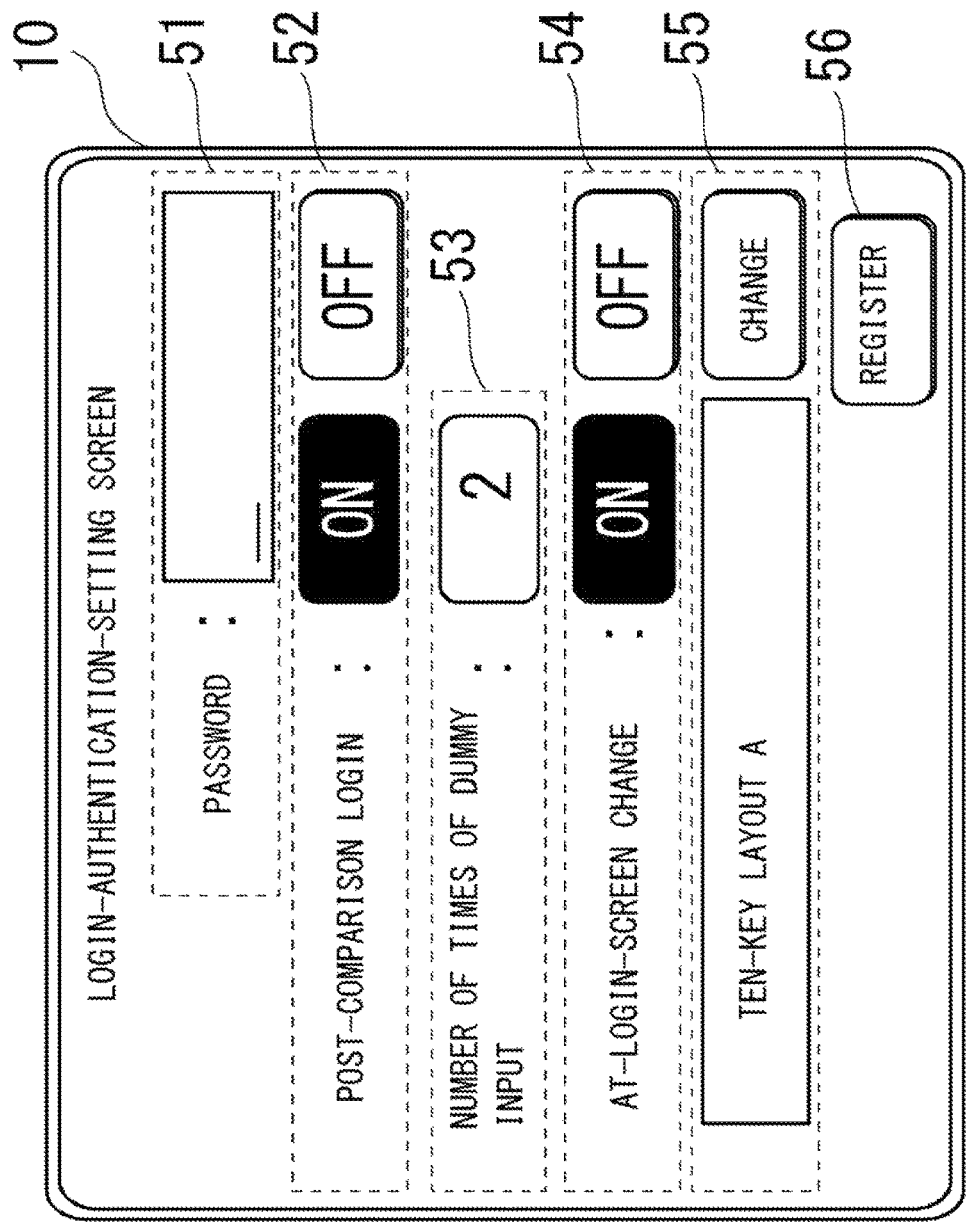
FIG. 2 illustrates an example of a login-authentication-setting screen that is displayed on the touch panel illustrated in FIG. 1.

On the login-authentication-setting screen, as illustrated in FIG. 2, there are a password-registration field 51, a post-comparison-login-selection field 52, a number-of-times-of-dummy-input-setting field 53, an at-login-screen-change-selection field 54, a screen-change-setting field 55 and a registration key 56.

The password-registration field 51 is a field for entering a registered password 21. In this embodiment, the registered password 21 is presumed to be a number string.

The post-comparison-login-selection field 52 is a field for selecting ON/OFF for whether or not to execute the post-comparison-login operation, and the selection is registered as setting information 22. The post-comparison-login operation is an operation that is a feature of the password-authenticating device of this embodiment, and is an operation in which the password cannot be perceived from the hand movement of the operation when entering the password. When OFF is selected in the post-comparison-login-selection field 52, the post-login operation is not executed, and a login operation of a typical example is executed in which whether or not to perform login is determined according to whether or not the entered password matches the registered password 21.

The number-of-times-of-dummy-input-setting field 53 is a field for setting the number of times that a dummy password is to be entered, and this setting is registered as setting information 22.

The at-login-screen-change-selection field 54 is a field for selecting ON/OFF for whether or not to change the screen at login, or in other words, change the error screen after the post-comparison-login operation is complete, and the selection is registered as setting information 22.

The screen-change-setting field 55 is a field for setting the changed location when ON is selected in the at-login-screen-change-selection field 54, and the setting is registered as setting information 22.

Next, the post-comparison-login operation for the case in which ON is selected in the post-comparison-login-selection field 52 will be explained in detail with reference to FIG. 3 to FIG. 6.

Figure 3:
FIG. 3 illustrates the login operation after comparison in an embodiment of a password-authenticating device according to the present disclosure.

Referring to FIG. 3, first, the control unit 30, together with initializing the variable n to 0 (step 101), and initializes the variable m to 0 (step 102).

Figure 4:
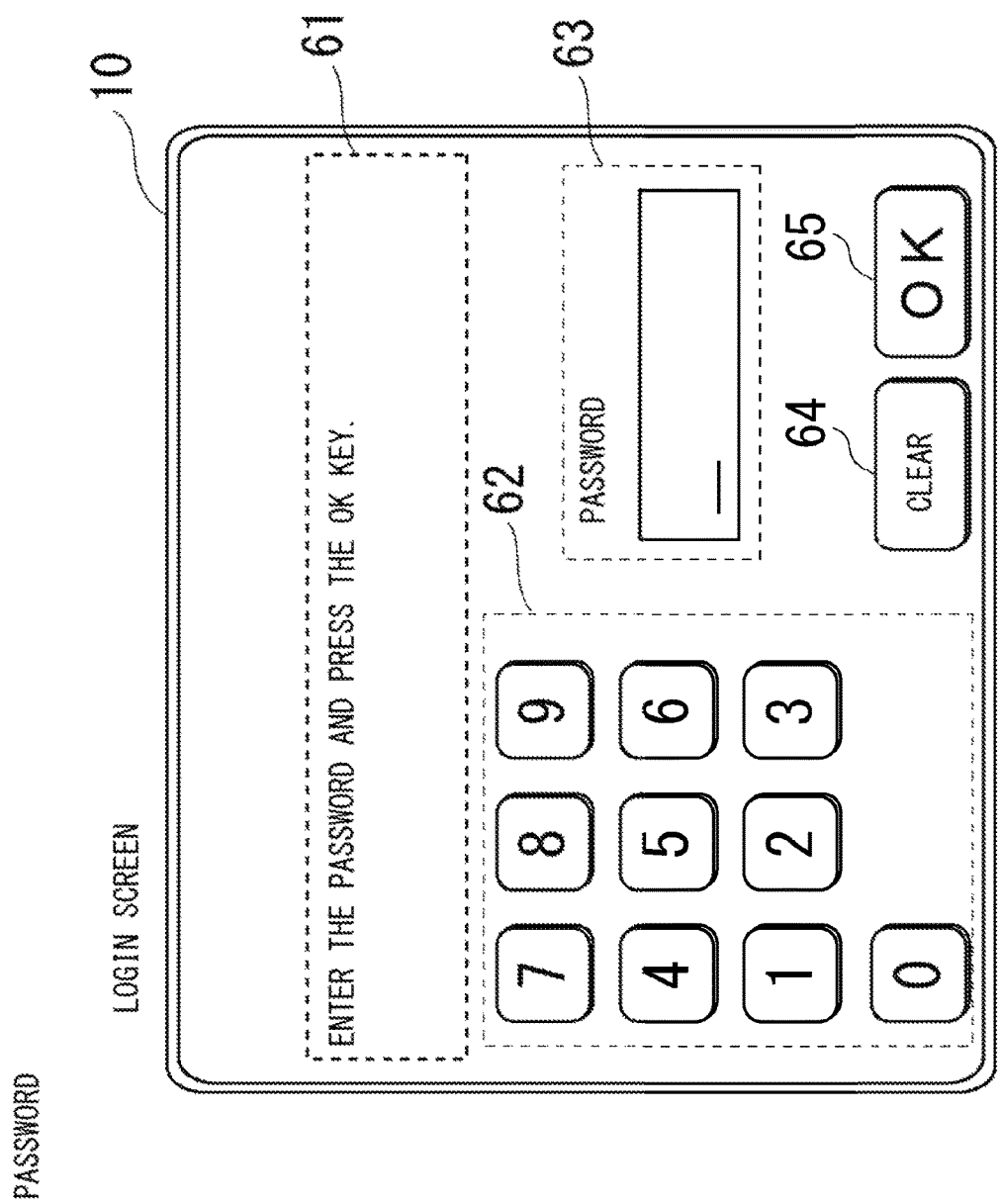
FIG. 4 illustrates an example of a login screen that is displayed on the touch panel illustrated in FIG. 1.

Next, the screen-generating unit 31 generates a login screen for receiving entry of a password, and the display-control unit 32, as illustrated in FIG. 4, displays the login screen on the touch panel 10 (step 103).

As illustrated in FIG. 4, an entry-guide message 61 for providing guidance for entering a password, a ten-key 62, a password-input field 63, a clear key 64, and an OK key 65 are arranged on the login screen. The OK key 65 on the login screen is an operation key for giving an instruction to receive the password that is entered in the password-input field 63. On the login screen, the operator enters a password in the password-input field 63 by operating the ten-key 62, and then operating the OK key 65.

When the OK key 65 is operated on the login screen, the comparison unit 33 receives the password that is entered in the password-input field 63 (step 104), and determines whether or not the entered password matches the registered password 21 (step 105).

In step 105, when the password that is entered in the password-input field 63 does not match the registered password 21, the authenticating unit 34 increments the variable m (step 106), and determines whether or not the variable m has reached a preset upper limit number of times of input M (step 107). The variable m indicates the number of times that a wrong password is entered.

Figure 5:
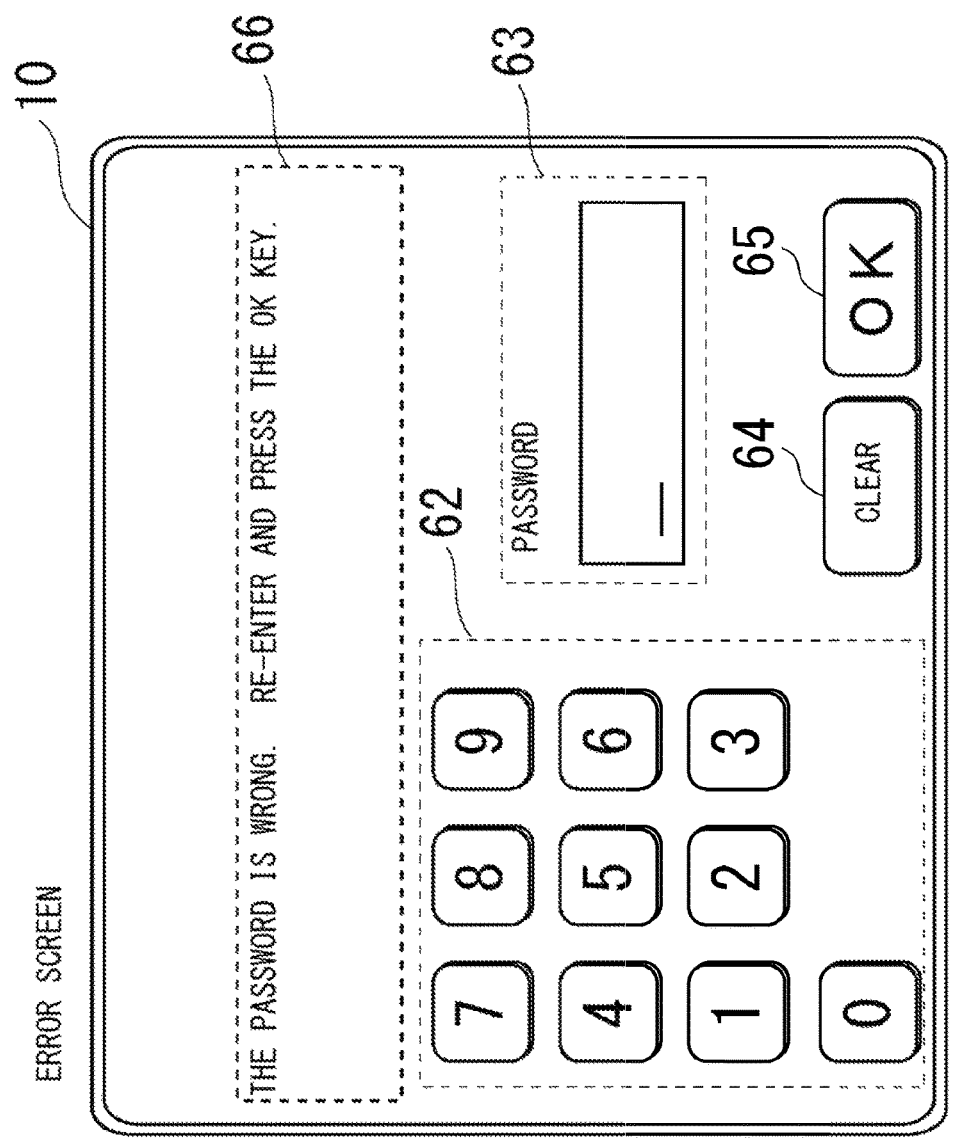
FIG. 5 illustrates an example of an error screen that is displayed on the touch panel illustrated in FIG. 1.

In step 107, when the variable m has not reached the upper limit number of times of input M, the screen-generating unit 31 notifies that the password is wrong and that login failed, then generates an error screen for receiving re-entry of the password, and the display-control unit 32, as illustrated in FIG. 5, displays the error screen on the touch panel 10 (step 108).

As illustrated in FIG. 5, an error guidance message 66 for providing guidance for re-entering the password, a ten-key 62, a password-input field 63, a clear key 64 and an OK key 65 are arranged on the error screen. The OK key 65 on the error screen is an operation key for giving an instruction to receive the password that is re-entered into the password-input field 63. On the login screen, the operator re-enters the password into the password-input field 63 by operating the ten-key 62, then operates the OK key 65.

When the OK key 65 is operated on the error screen, the comparison unit 33 receives the password that is re-entered into the password-input field 63 (step 109), then processing returns to step 105 and the comparison unit 33 determines whether or not the re-entered password matches the registered password 21.

In step 107, when the variable m has reached the upper limit of the number of times of input M, the authenticating unit 34 prohibits login using that password (step 110), and ends the post-comparison login operation.

In step 105, when the password that is entered in the password-input field 63 matches the registered password 21, the screen-generating unit 31 generates an error screen for receiving re-entry of the password. Moreover, the display-control unit 32, as illustrated in FIG. 5, displays the error screen on the touch panel 10 (step 111).

When the OK key 65 is operated on the error screen, the comparison unit 33 receives the password that is re-entered into the password-input field 63 (step 112).

When the password that is re-entered in step 112 is received, the comparison unit 33 does not determine whether or not the received password matches the registered password 21. Moreover, the authenticating unit 34 increments the variable m (step 113), and determines whether or not the variable n has reached the number of times of dummy input N that is registered in the setting information 22 (step 114).

In step 114, when the variable n has not reached the number of times of dummy input N, processing returns to step 111. As a result, re-entry of the password on the error screen in step 112 is repeated until the variable n reaches the number of times of dummy input N. In step 112, the re-entered password is not determined to match the registered password 21, so the operator can enter a dummy password that is different from the registered password. Moreover, in step 111 to step 114, the variable m is not incremented, and the variable m does not reach the upper limit number of times of input M, so login using a password is not prohibited by entering a dummy password.

In step 114, when the variable n has reached the number of times of dummy input N, the screen-generating unit 31 generates a login-completion screen for receiving re-entry of the password, and the display-control unit 32, as illustrated in FIG. 6, displays the login-completion screen on the touch panel 10 (step 115).

The login-completion screen is a screen on which part of the error screen illustrated in FIG. 5 is changed based on the change location that is registered in the setting information 22. The ten-key 62*a* that is arranged on the login-completion screen that is illustrated in FIG. 6A is such that the layout of the ten-key 62 of the error screen illustrated in FIG. 5 is changed. Moreover, the error-guidance message 66*a* that is arranged on the login-completion screen illustrated in FIG. 6B is such that the error-guidance message 66 on the error screen illustrated in FIG. 5 is changed from "." to "!!". In addition, the login-completion screen may be such that the color of the error screen is changed, or such that marks are added to the error screen.

The login-completion screen is a screen that is displayed when the at-login-screen change is ON in the setting information 22, and when the at-login-screen change is OFF in the setting information 22, the error screen that is illustrated in FIG. 5 is displayed in step 115.

A proper operator leaves the password-input field 63 empty on the login-completion screen or error screen that is displayed in step 115, and operates the OK key 65. A proper operator, by remembering the change location in the setting information 22 knows that the re-entry of the password has reached the number of times of dummy input N according to the login-completion screen that is displayed in step 115 without paying attention to the number of times that the password has been re-entered. Moreover, a proper operator, by remembering the number of times of dummy input N of the setting information 22, can also handle the screen when the error screen is displayed in step 115.

On the other hand, an improper operator does not know the number of times of dummy input N or the change location in the setting information 22, so re-enters the password in the password-input field 63 by operating the ten-key 62 and then operates the OK key 65.

When the OK key 65 is operated on the login-completion screen (or error screen) that is display in step 115, the comparison unit 33 receives the password that is re-entered in the password-input field 63 (step 116) and determines whether or not a password is entered (step 117).

In step 117, when a password is not entered, the authenticating unit 34 executes the login process (step 118), and ends the post-comparison login operation.

In step 117, when a password is entered, the authenticating unit 34 recognizes the login as an improper login, and prohibits login using that password (step 119). Together with this, the authenticating unit 34, via the communication unit 40, transmits an improper login notification that notifies that there is a possibility that there is an improper login to a pre-registered destination (portable terminal and the like) (step 120), and ends the post-login operation.

In step 114, when the variable n has reached the number of times of dummy input N, the authenticating unit 34 may immediately execute the login process in step 118. In this case as well, the login process is executed by a dummy password, so it is possible to prevent a password from being perceived from the hand movement of the operating during entry of the password.

Moreover, when the at-login-screen change is ON in the setting information 22, the operator knows from the login-completion screen that re-entry of the password has reached the number of times of dummy input N, so the number of times of dummy input N may be configured so as to be randomly changed every time the login process is executed.

As explained above, this embodiment is a password-authenticating device 1 that executes a login process by comparing an entered password with a registered password 21. The password-authenticating device 1 includes a comparison unit 33, and an authenticating unit 34. When the entered password matches the registered password 21, the comparison unit 33 receives re-entry of the password the set number of times of dummy input N. After the comparison unit 33 receives re-entry of the password the number of times of dummy input N, the authenticating unit 34 executes the login process regardless of whether or not the re-entered password matches the registered password 21.

With this configuration, by entering dummy passwords after a password is entered that matches the registered password, the login process is executed. Therefore, even though the pressed position is seen during operation for entering the password, it is not possible to identify which password the login process is being executed for, so it is possible to prevent a proper password from being perceived from the hand movement of the operating when entering a password.

Furthermore, according to this embodiment, a password-input field 63 in which a password is entered, and an OK key 65 that instructs the comparison unit 33 to receive the password that is re-entered in the password-input field 63 are arranged. Moreover, there is provided a touch panel 10 that displays an error screen for notifying when login failed. After re-entry of the password is received by the comparison unit 33 the number of times of dummy input N, when the OK key 65 is operated in a state in which the password-input field 63 on the error screen is empty, the authenticating unit 34 executes the login process, and when the OK key 65 is operated in a state in which a password is entered into the password-input field 63, the authenticating unit 34 prohibits login.

With this configuration, it is possible to prevent improper login by a third party. In other words, a third party that does not know the number of times of dummy input N will re-enter the password on the error screen even after the comparison unit 33 has received re-entry of the password the number of times of dummy input N.

Furthermore, according to this embodiment, a communication unit 40 that transmits data to a registered terminal via a network is provided, and after the comparison unit 33 has received re-entry of the password the number of times of dummy input N, when the OK key 65 is operated in a state in which the password is entered into the password-input field 63 on the error screen, the authenticating unit 34, via the communication unit 40, transmits an improper-login notification to a terminal.

With this configuration, it is possible to notify a manager or the like that there is improper login by a third party.

Furthermore, according to this embodiment, after the comparison unit 33 has received re-entry of the password the number of times of dummy input N, the touch panel 10 displays an error screen of which part is changed as a login-completion screen. On the login-completion screen, the layout of the ten-key for entering the password into the password-input field 63, or the guidance message and the like is changed from that of the error screen.

With this configuration, by remembering the change location of the setting information 22, a proper operator can know from the login-completion screen when re-entry of the password has reached the number of times of dummy input N even without paying attention to the number of times the password has been re-entered.

Furthermore, according to this embodiment, an upper limit of the number of times that a password that does not match the registered password is entered is set as the upper limit of the number of times of input M, and the number of times of dummy input N is not counted as the upper limit of the number of times of input M.

In a typical example, even though entered characters are hidden, there is a problem in that a password can be perceived from the hand movement of the operator during entry of the password (pressed positions of keyboard operation) and leaked.

According to the present disclosure, the login process is executed by entering a dummy password after entering a password that matches the registered password. Therefore, even though the pressed positions during operation for entering the password may be seen, it is not possible to identify which password the login process is executed for, so there is an effect for being able to prevent the proper password from being perceived from the hand movement of the operator while entering the password.

The technology according to the present disclosure is not limited to the embodiments described above, and it is clear that the embodiments may be suitably changed within the technical scope of the present disclosure.

What is claimed is:

1. A password-authenticating device that executes a login process by comparing an entered password candidate with a registered password, comprising a screen-generating unit, a display unit, a comparison unit, and an authenticating unit, wherein:

the screen-generating unit generates a setting screen for receiving setting information;

the screen-generating unit generates a login screen for receiving the entered password candidate;

the password-authenticating device is configured such that, when the entered password candidate matches the registered password, a) the display unit displays a first error screen on which a password-candidate-input field and an operation key are arranged, and that gives notification that login failed, wherein operation of the operation key instructs the comparison unit to receive, as a dummy input, a password candidate that is re-entered into the password-candidate-input field;

b) the comparison unit receives said re-entry of a password candidate as a dummy input a set number of times of dummy input, wherein each time corresponds to an instance of operation of the operation key; and then c) the authenticating unit determines whether said re-entry of a password candidate as a dummy input has been received the set number of times of dummy input;

d) only after reception of re-entry of a password candidate has reached the set number of times of dummy input, the display unit displays, as a login-completion screen, a second error screen on which a password-candidate-input field and an operation key are arranged, and that gives notification that login failed, wherein operation of the operation key of the second error screen instructs the comparison unit to receive a password candidate that is re-entered into the password-candidate-input field of the second error screen; and then e) the authenticating unit i) executes the login process based on whether the operation key of the second error screen is operated in a state in which the password-candidate-input field on the second error screen is empty, ii) executes the login process only when the operation key of the second error screen is operated in a state in which the password-candidate-input field on the second error screen is empty, regardless of whether or not a re-entered password candidate matches the registered password, and iii) prohibits login only when the operation key of the second error screen is operated in a state in which a password candidate is re-entered into the password-candidate-input field of the second error screen;

the setting information comprises a selection of whether or not to change a part of the second error screen relative to the first error screen;

the second error screen is different than the first error screen if the received setting information comprises a selection to change the part of the second error screen relative to the first error screen; and the second error screen is not different than the first error screen if the received setting information comprises a selection to not change the part of the second error screen relative to the first error screen.

2. The password-authenticating device according to claim 1, further comprising a communication unit that transmits data to a registered terminal via a network; wherein after reception of re-entry of a password candidate has reached the number of times of dummy input, when the operating key of the second error screen is operated in a state in which a password candidate is re-entered into the password-candidate-input field on the second error screen, the authenticating unit, via the communication unit, transmits an improper-login notification to the terminal.

3. The password-authenticating device according to claim 1, wherein on the login-completion screen, the layout of a ten-key that is used for entering the password candidate into the password-candidate-input field is changed from that of the first error screen.

4. The password-authenticating device according to claim 1, wherein on the login-completion screen, a guidance message is changed from that of the first error screen.

5. The password-authenticating device according to claim 1, wherein an upper limit of the number of times that the password that does not match the registered password is entered is set as an upper limit of the number of times of input; and the number of times of dummy input is not counted as the upper limit of the number of times of input.

6. The password-authenticating device according to claim 1, wherein the received setting information comprises a selection to change a location of information shown on second error screen relative to the first error screen.

7. The password-authenticating device according to claim 1, wherein said difference of the second error screen relative to the first error screen comprises a difference selected from a change in color, a change in punctuation used in a guidance message, an added mark, and a change in a location of information shown on second error screen relative to the first error screen.

* * * * *